United States Patent [19]

Djupsjöbacka

[11] Patent Number: 5,161,206
[45] Date of Patent: Nov. 3, 1992

[54] METHOD OF LINEARIZING A TRANSMISSION FUNCTION OF A MODULATOR ARRANGEMENT, AND A LINEARIZED MODULATOR

[75] Inventor: Anders G. Djupsjöbacka, Solna, Sweden

[73] Assignee: Telefonaktiebolaget L M Ericsson, Stockholm, Sweden

[21] Appl. No.: 769,812

[22] Filed: Oct. 2, 1991

[30] Foreign Application Priority Data

Oct. 3, 1990 [SE] Sweden ............................ 9003158

[51] Int. Cl.$^5$ ............................ G02B 5/172; G02B 6/26
[52] U.S. Cl. ............................................. 385/2
[58] Field of Search ............................ 385/1-11

[56] References Cited

U.S. PATENT DOCUMENTS

| | | | |
|---|---|---|---|
| 4,471,116 | 5/1984 | King et al. | 350/96.13 |
| 4,798,429 | 1/1989 | Djupsjöbacka | 350/96.14 |
| 4,842,367 | 6/1989 | Djupsjöbacka | 350/96.14 |
| 4,850,667 | 7/1989 | Djupsjöbacka | 350/96.14 |
| 4,878,030 | 10/1989 | Vincze | 330/149 |

FOREIGN PATENT DOCUMENTS 61-81057  4/1986  Japan .

*Primary Examiner*—Akm E. Ullah
*Attorney, Agent, or Firm*—Burns, Doane, Swecker & Mathis

[57] ABSTRACT

A modulator arrangement comprises two Mach-Zehnder modulators, a main modulator (2) and a compensation modulator (3) having non-linear transmission functions. The modulators (2, 3) are controlled by a modulating control signal (V), via electrodes (16, 17). A carrier wave (S1) from a laser (7) is power divided (a, 1-a) into part-waves in a power divider (5) between the modulators (2, 3). The modulated part-waves (S2, S3) are superimposed at an output (14) to produce a resultant modulated wave (S4). A linearized transmission function between the control voltage (V) and the power of the resultant modulated wave (S4) has a radius of curvature whose length is maximized within a control voltage range, so as to minimize intermodulation distortion. The mean slope of the transmission function is maximized within this range. At a common control voltage (V) for the modulators (2, 3), the modulator arrangement has an optimal transmission function at a length ratio $b = \sqrt{3}:1$ between the modulators (2, 3), and a power ratio between the part-waves of $\sqrt{3}:9$. The main modulator (2) is the shortest and modulates the strongest part-wave.

4 Claims, 3 Drawing Sheets

METHOD OF LINEARIZING A TRANSMISSION FUNCTION OF A MODULATOR ARRANGEMENT, AND A LINEARIZED MODULATOR

TECHNICAL FIELD

The present invention relates to a method; of linearizing a transmission function of a modulator arrangement that has at least two part modulators, each having a transmission function which deviates from a linear course, said method comprising the steps of
applying carrier waves to inputs of the part-modulators;
applying modulating control signals to control devices of the part-modulators, wherein the amplitudes of the control signals are proportional to a common control signal value;
modulating the carrier waves with said control signals to produce modulated part-waves which are delivered from outputs of the part-modulators;
superimposing the modulated part-waves to produce a resultant modulated wave in a connector device located between the outputs of said part-modulators; and
assigning to the linearized transmission function between the power of the resultant modulated wave and the common control signal value a desired mean slope which lies within a control signal value range.

The invention also relates to a modulator arrangement having a linearized transmission function.

BACKGROUND ART

In the analogue transmission of TV-signals over optical fibres, for example, it is highly desirable to be able to modulate a transmitted carrier wave linearly. Non-linear modulation will give rise to intermodulation distortion which disturbs adjacent channels. Carrier waves having frequencies of 50 MHz, 100 MHz and 150 MHz may be transmitted on an optical fibre. In the case of nonlinear modulation, the two first mentioned carrier wave frequencies can be added together and therewith have a disturbing effect on the 150 MHz frequency.

One usual method of modulating the carrier wave in the analogue transmission of TV-signals is to use a laser diode of constant light power and to modulate its exiting light wave with the aid of an external modulator. The so-called Mach-Zehnder modulator is one type of modulator that is often used in this respect, this modulator having a sinusoidal-like transmission function in its basic form. This transmission function can be linearized, for instance in the manner described in an article in SPIE Vol. 1102, Optical Technology for Microwave Applications IV (1989) by J. J. Pan: "High Dynamic Range Microwave Electro-Optic Modulators". The article describes, with reference to FIG. 3, a modulator which comprises two parallel-coupled electro-optical Mach-Zehnder modulators. An incoming light wave is divided between the modulators and is modulated in one of the Mach-Zehnder modulators by an electric microwave signal of desired fundamental frequency. Because the modulator is not linear, harmonics of the fundamental frequency appear in the modulated light signal. An undesirable contribution from the first occurrent harmonic, having a frequency which, in this case, is three times the fundamental frequency, is compensated out. This is effected by modulating the incoming light wave in the other of said Mach-Zehnder modulators and the light waves from the two modulators are superimposed on the modulator output. The undesirable contribution for the first harmonic can be compensated out by selection of the modulation voltages to the two modulators, among other things. A linearized Bragg-modulator is described in an article by P. R. Ashley and W. S. C. Chang: "Linearization Technique for a Guidewave Electrooptic Bragg Modulator", Proceedings IGWO '86, poster paper THCC 12. This modulator has two parallel-coupled Bragg-elements and its transmission function compensates for the first occurrent harmonic. The manner in which compensation is achieved corresponds to the manner of achieving compensation with the aforedescribed parallel-coupled Mach-Zehnder modulators.

One drawback with the aforedescribed modulators is that compensation is achieved solely for the first occurrent harmonic. It is possible to compensate out additional harmonics, by coupling several modulator elements in parallel. Such modulators, however, are complicated and it is found that only small improvements can be achieved. In the case of some applications, a completely non-compensated Mach-Zehnder modulator will even give a lower intermodulation distortion than a modulator which has been compensated in the aforedescribed manner.

DISCLOSURE OF THE INVENTION

The present invention solves the aforementioned difficulties of intermodulation distortion between separate channels when modulating a constant carrier wave. The invention is based on the concept of considering the radius curvature of the transmission function of the modulator and not the harmonics of the modulated signal, as with the known technique. The signal of a non-linear part-modulator is compensated to a linearized transmission function by superimposing an output signal of at least one further non-linear part-modulator on the main modulator signal. Conventionally, there is sought a large mean slope of the linearized transmission function within a suitably selected range of the modulator control signal. This will provide good modulation of the carrier wave within a reasonable control signal amplitude. According to the present invention, the radius of curvature of the linearized transmission function is considered within this control signal range. For optimum modulator design, this radius shall have the largest possible value within the range selected.

BRIEF DESCRIPTION OF THE DRAWINGS

An exemplifying embodiment of the invention will now be described in more detail with reference to the accompanying drawings, in which.

BEST MODE OF CARRYING OUT THE INVENTION

Figure 1:
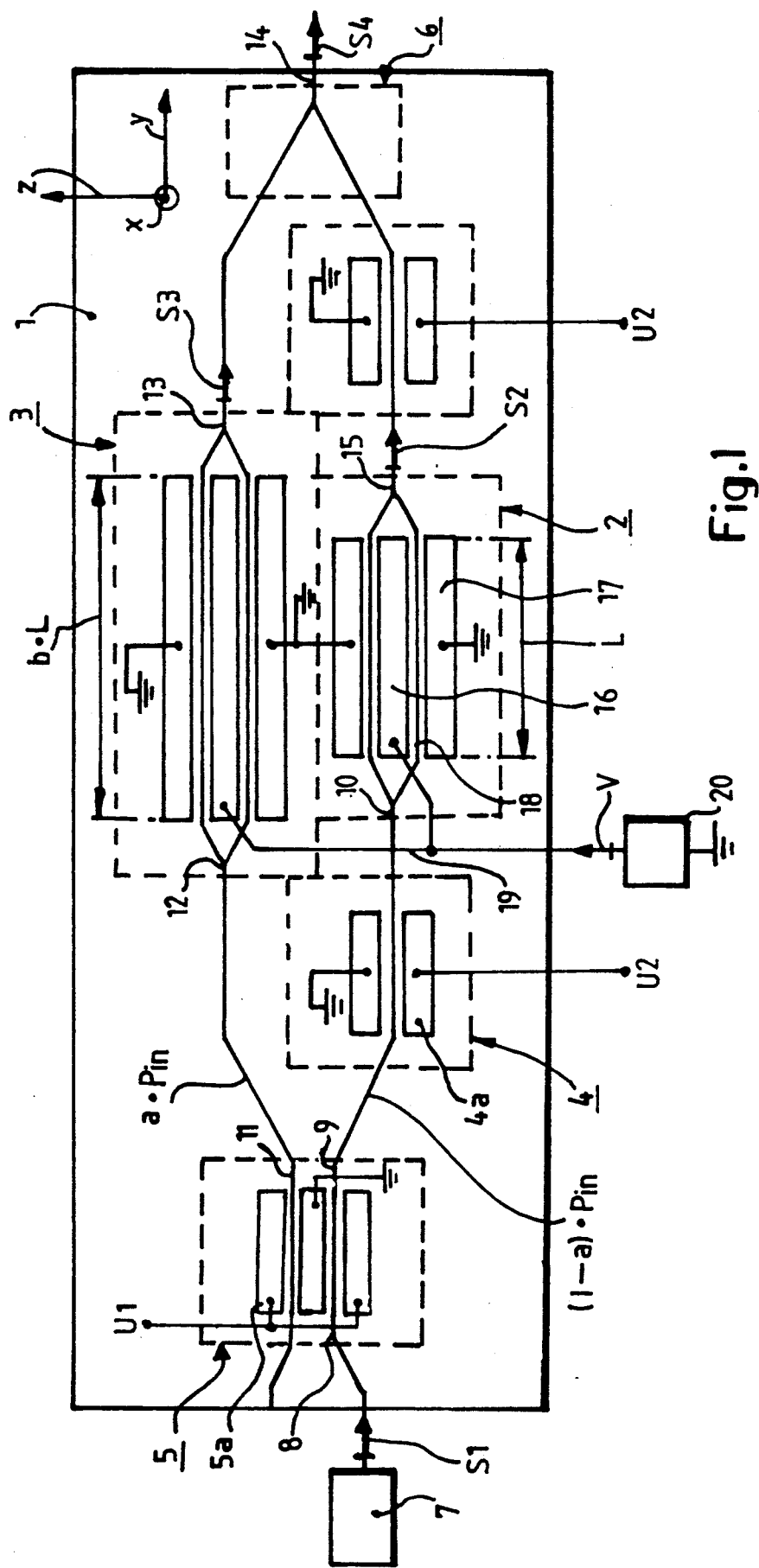
FIG. 1 is a top view of an inventive modulator arrangement.

FIG. 1 illustrates an inventive, electrooptic modulator arrangement. It comprises a single-crystal wafer 1 of lithium niobate which has two part-modulators 2 and 3 on its upper surface. In the case of the illustrated embodiment, these modulators are Mach-Zehnder modulators. A description of Mach-Zehnder modulators is given, for instance, in Appl. Phys. Lett. 33 (11), Dec. 1, 1978, W. K. Burns, et al: "Interferometric Waveguide Modulator With Polarization-Independent Operation". The modulator arrangement has two phase shifters 4, one power divider 5 and one connector device 6 which interconnects the part-modulators 2 and 3.

The power divider 5 is a directional coupler having an input 8 which is connected to a laser diode 7, a first output 9 which is connected to an input 10 of the part-modulator 2, and a second output 11 which is connected to an input 12 of the part-modulator 3. Arranged in the interaction region of the power divider 5 are electrodes 5a which function to influence distribution of the light power to both of the part-modulators. The phase shifters 4 have electrodes 4a by means of which changes can be made to the refraction index in the phase shifter waveguides. The part-modulator 3 has an output 13 which is connected to an output 14 of the modulator arrangement by means of the connector device 6. Correspondingly, the part-modulator 2 has an ouput 15 which is connected to the output 14. Each of the two part-modulators has an individual control device which includes a centre electrode 16 and two outer electrodes 17. The two waveguides 18 of respective modulators extend in the space between the electrodes. The crystallographic x-axis of the lithium niobate wafer 1 is perpendicular to the upper wafer surface, the y-axis is parallel with the waveguides 18, and the z-axis is perpendicular to the waveguides 18, as illustrated with the coordinate system x, y, z shown in the drawing. This selection of crystal axis orientation causes the waveguides to be placed between the electrodes 16 and 17 as shown in the drawing, in a known manner.

One electrode 5a of the power divider 5 is connected to earth potential and its two remaining electrodes are connected to a control voltage U1, through which power division is controlled. All of the outer electrodes 17 of the modulators are connected to earth potential and the centre electrodes 16 are connected together by an electrical connection line 19. This line is connected, in turn, with a schematically illustrated control signal source 20 which generates a modulated control signal V common to both part-modulators. A carrier wave S1 delivered from the laser diode 7 is divided in the power divider 5 and modulated in the part-modulators 2 and 3 to form modulated part-waves S2 and S3 respectively. The part-waves are superimposed in the connector device 6, to form a resultant modulated wave S4, which is delivered from the output 14.

Each of the two part-modulators 2 and 3 have between the control signal V and the power of the respective part-waves S2 and S3 a transmission function which follows sinusoidal-like functions. One such function is illustrated by a curve A in FIG. 2, which applies to the part-modulator 2. The reference sign V signifies the aforesaid modulating control signal and the symbol P signifies light power, which in the case of the curve A is the power of the modulated part-wave S2. The part-modulator 2 is considered to be the main modulator for the carrier wave S1. The non-linear transmission function A is linearized by superimposing the modulated part-wave S3 obtained from the part-modulator 3, which is considered as the compensation modulator. The following mathematical relationship gives the transmission function A for the part-modulator 2 with a good degree of accuracy:

$$P2 = P_{in} \cdot (1-a) \cdot \{0.5 + 0.5 \sin(\pi \cdot V/V_\pi)\}$$

where the modulator is activated around the inflection point of the transmission function. In this relationship, P2 is the light power of the part-wave S2 and Pin is the light power of the carrier wave S1. The reference sign a signifies the proportion of light power applied to the part-modulator 3 and the reference sign (1−a) signifies the proportion of light power to the part-modulator 2. The argument for the sinus function includes a voltage $V_\pi$, in which the light power P2 equals 0. The argument of the sinus function can also be expressed by a phase angle $\Delta\phi = \delta \cdot V \cdot L \cdot k$, where k is a material constant for the wafer 1, L is the length of the part-modulator, and δ is an overlap factor between the electrical field from the electrodes 16 and 17 and the electrical field of the optical mode. The argument $\Delta\phi$ of the sinus function is sometimes referred to as the accummulated phase and expresses in mathematical terms the physical aspect of the phase shifting effect of the modulator on the carrier wave. The part-modulator 3 has a transmission function which is similar to the transmission function of the part-modulator 2. The modulator arrangement shown in FIG. 1 has a linearized transmission function between the modulating control signal V and the power P4 of the exiting resultant wave S4. This function is given by the relationship $$P4 = P_{in} \cdot (1-a) \cdot \{0.5 + 0.5 \sin(\pi \cdot V/V_\pi)\} \pm \pm P_{in} \cdot a \cdot \{0.5 + 0.5 \sin(b \cdot \pi \cdot V/V_\pi)\} \quad (1)$$

Figure 2:
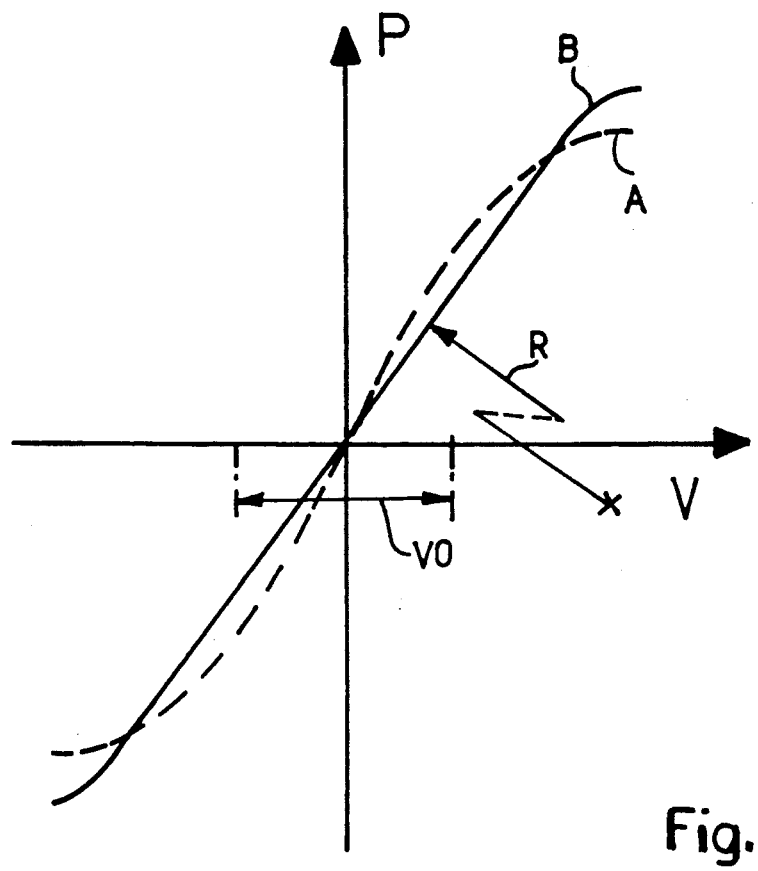
FIG. 2 is a diagramme showing transmission functions.

In this relationship, the symbol b expresses the length ratio between the electrodes of the part-modulator 3 and the part-modulator 2. The linearized transmission function is shown in FIG. 2 with a curve B. The reference sign ± signifies that the outgoing part-waves S2 and S3 of the two part-modulators are mutually in phase and mutually in counterphase respectively. This phase between the part-waves can be controlled with a voltage U2 which is applied to one of the electrodes 4a of respective phase shifters 4. The other of the electrodes 4a is connected to earth potential.

In order for the modulator arrangement to work satisfactorily, it is desirable that the linearized transmission function B has a large mean slope within a control signal range VO. It may be a requirement within this control signal range that the intermodulation distortion lies beneath a desired value. According to the present invention, it is a radius of curvature R of the linearized transmission function B which is decisive for this intermodulation distortion. If this distortion is to lie beneath the desired value, then the length of the curvature radius shall exceed a smallest value. The curvature radius R is marked schematically in FIG. 2. It should be noted that the length of the actual curvature radius is much greater than the length shown in the Figure, as indicated by the broken line of said radius.

In the case of the embodiment illustrated in FIG. 1, the modulator arrangement has two degrees of freedom for influencing the transmission function B with its curvature radius R. One of these degrees of freedom is the power division between the part-modulators 2 and 3, the factor b. Power division is influenced in the power divider 5 by the voltage U1, which is applied over the electrodes 5a of the directional couplers. The other degree of freedom is the length ratio between the electrodes of the part-modulators, the factor b. This factor influences the argument for the one sinus function in the linearized transmission function. It should be noted that the arguments for the sinus functions can be influenced in other ways, namely by selection of separate control signals for the two part-modulators, or by selection of separate overlap factors $\delta$. In the case of the illustrated embodiment, it has been elected to maintain $\delta$ and V equal for both part-modulators and to provide these with electrodes of different lengths. The argument for the sinus function can be readily influenced with the aid of present techniques. One and the same template is used in the manufacture of the two part-modulators and the template is demasked to provide different lengths. Thus, the overlap factor $\delta$ is automatically the same for both of the part-modulators. Although it is possible to use separate templates in the manufacture of the different part-modulators in order to influence the factor $\delta$, it is very difficult to obtain the value of $\delta$ with sufficient accuracy when using present-day techniques. It is also difficult when applying present-day techniques to produce a large control voltage of sufficient linearity in respect of both phase and amplitude. The maximum amplitude of the voltage capable of being generated is utilized to the full in the modulator arrangement illustrated in FIG. 1.

The transmission function of the modulator arrangement shown in FIG. 1 is given by the relatively simple relationship (1) above. In this relationship, the values of the parameters a and b can be caluclated analytically and the desired linearized transmission function B established. In this case, there is utlized the fact that the curvature radius R can be expressed, at least approximatively, as a quotient between, in the numerator, an expression containing the first derivative of the transmission function and, in the denominator, the second derivative of the function. The value of the second derivative is minimized in a working range VO, by establishing a relationship between the parameters a and b. With this selection of the parameters a and b, the first derivative is maximized in the same range. This means that the curvature radius, R, for the transmission function, B, has been maximized in the range concerned. It is now possible, e.g. by simulation, to check that the intermodulation distortion lies beneath the desired value in said range. If such is not the case, a further, smaller working range can be selected and the procedure is repeated within this range. A transmission function for the modulator arrangement shown in FIG. 1 optimized in the aforedescribed manner follows the relationship $$P4/Pin = \{9/(9+\sqrt{3})\} \cdot \{0.5 + 0.5 \sin(\pi \cdot V/V_\pi)\} - - \{\sqrt{3}/(9+\sqrt{3})\} \cdot \{0.5 + 0.5 \sin(\sqrt{3} \cdot \pi \cdot V/V_\pi)\} \quad (2)$$

It is ensured that the modulated part-waves S2 and S3 are mutually in counterphase with the aid of the voltage U2 on the electrodes 4a of the phase shifters, as stated by the minus sign between the two parenthesis in the relationship (2).

Figure 3:
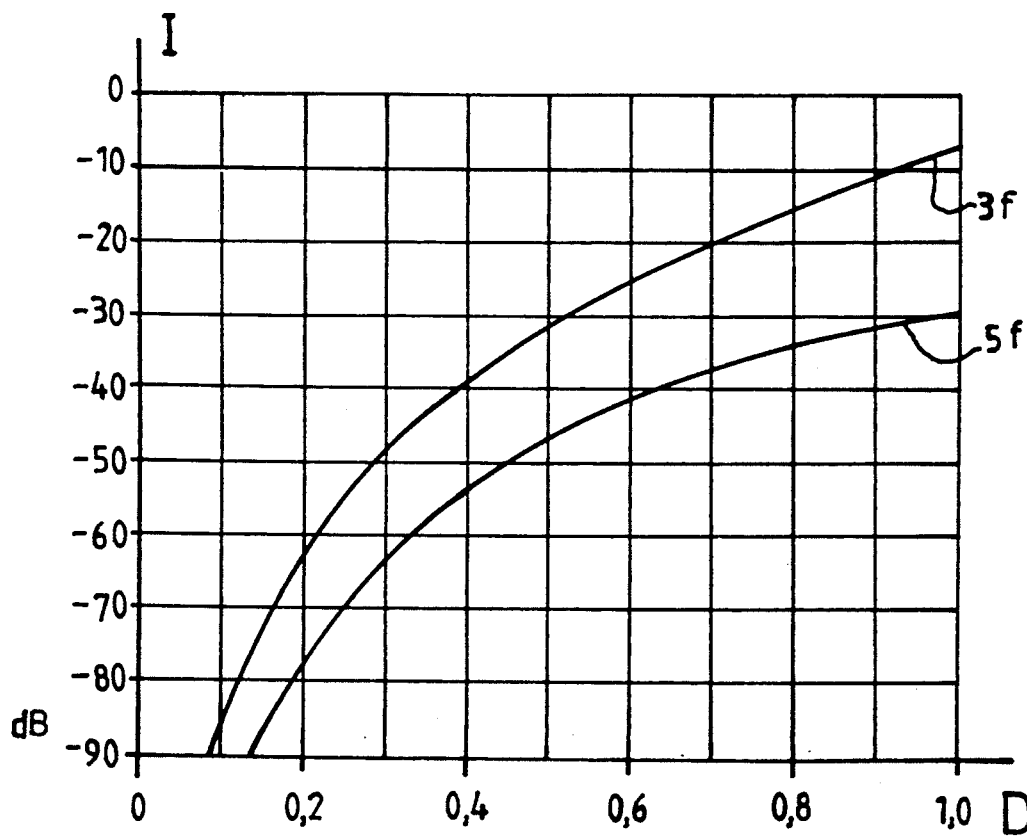
FIG. 3 is a diagramme showing disturbance levels for the modulator arrangement.

The optimized modulator arrangement generates disturbances whose levels are shown in FIG. 3. FIG. 3 is a diagramme in which the modulation depth, reference D, of the modulator is plotted on the abscissa. The power level I of the disturbance is plotted on the ordinate in relation to the harmonic of the modulated control signal V. This fundamental harmonic has a frequency referenced f. The modulation depth D is the quotient between the amplitude of the modulated light wave and the maximum possible amplitude of the light wave. In the case of a fully linear modulator, the modulation depth is directly proportional to the amplitude of the control signal. The diagramme includes two curves $3f$ and $5f$ which show the power level of the third and the fifth harmonic of the resultant modulated wave S4. It should be noted that the modulator has not been calculated with a starting point from the extinguishing of separate harmonics. The diagramme merely shows the properties of the inventive modulator, these properties being illustrated with the aid of the levels of the third and the fifth harmonics.

The transmission function for the modulator arrangement shown in FIG. 1 is given by the relationship 2 above. In this relationship, the factor a, the power division, and the factor b, the length ratio between the part-modulators, are selected in an optimal fashion. FIG. 3 discloses the smallest possible disturbances obtained for a given modulation depth I. It is possible, however, to produce an inventive modulator arrangement whose disturbances will lie beneath the disturbances given in FIG. 3. Such a modulator arrangement is more complicated and includes one further or several more parallel-coupled part-modulators. The transmission function for this more complicated modulator arrangement is calculated in the manner described above. The curvature radius R of the linearized transmission function is calculated within the working range VO. A smallest value of the curvature radius R is determined for the purpose of maintaining the disturbances beneath a given level. The transmission function of the modulator arrangement is adapted so that the curvature radius R will exceed this smallest value. As described above, this adaptation of the transmission function is effected by selection of the parameters in the transmission function, for example the selection of power division, the relationship between the values of the controlled voltages or the ratio between the lengths of the part-modulators. The more complicated modulator arrangement has several parameters which enable improved adaptation of the transmission function and a reduction in disturbances. The linearized transmission function has been calculated analytically in the embodiment illustrated in FIG. 1. It may be difficult to make such an analytical calculation in the case of the more complicated modulator arrangement, and other methods may be applied, for instance numerical methods. When selecting parameters for determining the transmission function, numerical methods can also be applied in the case of modulator arrangements whose part-modulators each have complicated transmission functions.

So-called absorption modulators are examples of the type of modulator that has a complicated transmission function. Absorption modulators have light waveguides of semi-conductor material which are made more or less transparent through the influence of an electric current or voltage. This influence is obtained with the aid of various material parameters, and modulators based on Stark-shift and Franz-Keldysh effect are those mostly commonly used in this regard. The material parameters render it difficult to express the transmission functions of the modulators in closed analytical forms.

Figure 4:
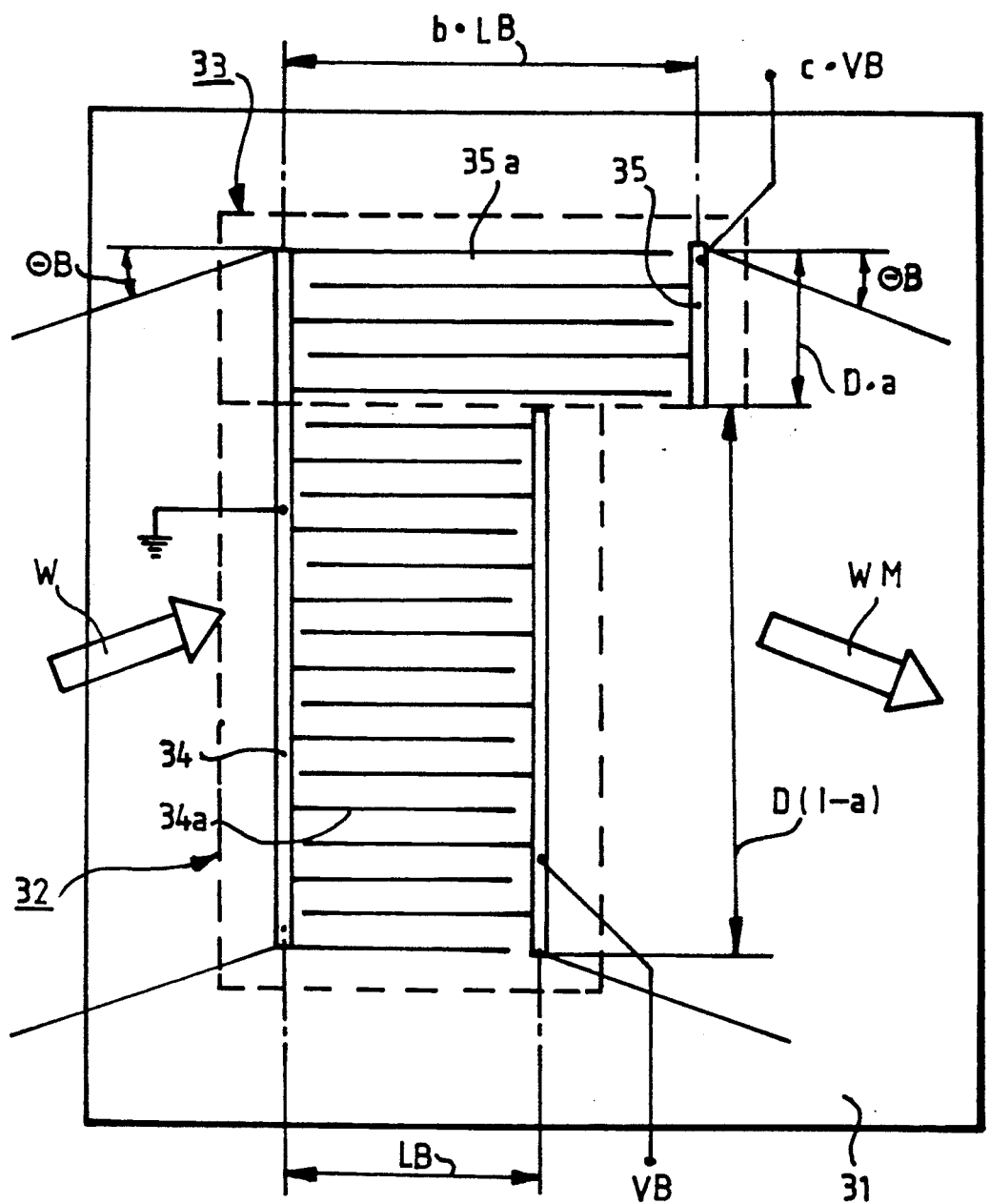
FIG. 4 is a view from above of an alternative embodiment of the invention.

An alternative embodiment of the invention will now be described briefly with reference to FIG. 4. This Figure illustrates a Bragg-modulator having a linearized transmission function. Two part-modulators 32 and 33 are placed on a substrate 31 of electro-optical material. The two part-modulators are both Bragg-elements, each having an array of lattice electrodes 34 and 35 respectively with respective fingers 34a and 35a. A respective modulated control signal VB and c·VB is applied between the electrodes. The part-modulator 32 has an electrode length LB and an electrode width D·(1−a) and the part-modulator 33 has an electrode length b·LB and an electrode width D·a. A planar light wave, falls on the electrodes 34, 35 of the modulator arrangement at an angle of incendence ΘB. Part of the power of the light wave W is deflected by diffraction with a surface acoustic or bulk acoustic wave generated by the electrodes, and a modulated wave WM leaves the modulator at the angle ΘB, as shown in the Figure. This modulated wave WM constitutes an overlay of deflected part-light waves from the two part-modulators 32 and 33. The power of the incident carrier wave W is divided in the relationship a to (1−a) as a result of the differing widths of the electrodes. The Bragg-elements have sinusoidal transmission functions, similar to the aforementioned Mach-Zehnder modulators. Similar to the above, there are found in the arguments of the sinus functions the modulated control signals VB and c·VB and the electrode lengths LB and b·LB. The transmission function of the modulator arrangement shown in FIG. 4 is linearized in a manner similar to that described with reference to the embodiment illustrated in FIG. 1. The curvature radius of the transmission function is considered and optimization is effected by selection of the parameters a, b and c. When selecting c=1, then $a=\sqrt{3}/(9+\sqrt{3})$ and $b=\sqrt{3}$ is obtained in the aforesaid manner. The Bragg-elements can also be modulated with the aid of light waves transmitted through the substrate 31. The wave fronts of the sound waves are parallel with the electrode fingers 34a, 35a and produce mechanical deformation in the substrate material. This results in a lattice in the substrate 1 which causes the light to diffract at the angle ΘB and the light wave W is modulated with the aid of the acoustic wave.

We claim:

1. A method of linearizing a transmission function of a modulator arrangement having at least two part-modulators, each having a carrier wave input and a modulated carrier wave output and a control device for modulating a control signal and exhibiting a transmission function which deviates from a linear course, said modulator arrangement further having a connector device located between the outputs of said part-modulators, said method comprising the steps of:

applying carrier waves to said inputs of the part-modulators;

applying modulating control signals to said control devices of the part-modulators, wherein the amplitudes of the control signals are proportional to a common control signal value;

modulating the carrier waves with said control signals to produce modulated part-waves which are delivered from outputs of the part-modulators;

superimposing the modulated part-waves to produce a resultant modulated wave in said connector device;

assigning to a desired linearized transmission function relating the power of the resultant modulated wave and the common control signal value a desired mean slope which lies within a control signal value range;

establishing a smallest value for the length of a curvature radius of the desired linearized transmission function within the range of the control signal value; and selecting a power ratio between the carrier waves delivered to the part-modulators, an amplitude ratio between the control signals of the part-modulators, and parameters of the transmission functions of the part-modulators so as to result in a curvature radius length which exceeds said smallest value.

2. A modulator arrangement having a linearized transmission function, said arrangement comprising:

at least two part-modulators, each having a carrier wave input and a modulated carrier wave output, and a control means for a modulating control signal, wherein each of the part-modulators has a transmission function relating the power of the modulated part-wave to the amplitude of the modulating control signal, said transmission function deviating from a linear course, and wherein a desired linearized transmission function of the modulator arrangement relating the power of the resultant modulated wave to the amplitude of the common control signal value within a range of the control signal value has a desired mean slope;

a connector device which extends between the part-modulator outputs to an output which is common to the modulator arrangement and in which a resultant modulated wave is generated by superimposing the modulated part-waves; and a control signal device which is connected to the part-modulator control devices and which functions to maintain the amplitudes of the modulating control signals proportional to a common control signal value;

wherein the linearized transmission function within the range of the control signal has a radius of curvature whose length exceeds a smallest value, said smallest value being determined by the arrangement of a power ratio between the carrier waves to the part-modulators, by the arrangement of parameter values for the transmission functions of the part-modulators, and by the arrangement of an amplitude ratio between the control signals of the part-modulators.

3. A modulator arrangement according to claim 2, wherein the modulator arrangement includes two part-modulators, a main modulator and a compensation modulator each of which exercises a phase-shifting effect on the carrier wave in accordance with respective sinusoidal transmission functions, said transmission functions being symmetrical about respective inflection points thereof, and wherein:

the ratio of power of the carrier wave to the main modulator to the power of the carrier wave to the compensation modulator is 9 to $\sqrt{3}$; and the ratio of phase-shifting effect on the carrier wave of the main modulator to the phase-shifting effect of the compensation modulator is 1 to $\sqrt{3}$.

4. A modulator arrangement according to claim 3, wherein the part-modulators are Mach-Zehnder modulators provided with light waveguides and wherein the control devices of said modulators include electrodes disposed along the light waveguides, and wherein:

said common control signal is applied to the electrodes of both part-modulators; and the lengths of the electrodes of the main modulator and of the compensation modulator have a ratio of 1 to $\sqrt{3}$.

* * * * *